US008754981B2

(12) United States Patent
Iyoda et al.

(10) Patent No.: US 8,754,981 B2
(45) Date of Patent: Jun. 17, 2014

(54) IMAGING APPARATUS WITH SUPPORTING DEVICE HAVING IMPROVED HEAT DISSIPATION

(75) Inventors: Makoto Iyoda, Osaka (JP); Yoshikazu Yamano, Osaka (JP); Shinya Ogasawara, Hyogo (JP); Tomonori Mizutani, Osaka (JP); Yasuhiro Miyamoto, Osaka (JP)

(73) Assignee: Panasonic Corporation, Kadoma-shi (JP)

( * ) Notice: Subject to any disclaimer, the term of this patent is extended or adjusted under 35 U.S.C. 154(b) by 0 days.

(21) Appl. No.: 13/395,124

(22) PCT Filed: Jun. 29, 2011

(86) PCT No.: PCT/JP2011/003727
§ 371 (c)(1),
(2), (4) Date: Mar. 9, 2012

(87) PCT Pub. No.: WO2012/077252
PCT Pub. Date: Jun. 14, 2012

(65) Prior Publication Data
US 2012/0274841 A1 Nov. 1, 2012

(30) Foreign Application Priority Data
Dec. 6, 2010 (JP) ................................. 2010-271858

(51) Int. Cl.
H04N 5/225 (2006.01)
(52) U.S. Cl.
USPC ........ 348/373; 348/374; 348/375; 248/187.1; 396/419

(58) Field of Classification Search
USPC .......... 348/374, 375, 373; 396/419, 535, 544, 396/421; 248/187.1
See application file for complete search history.

(56) References Cited

U.S. PATENT DOCUMENTS

2004/0125560 A1* 7/2004 Gotou et al. .................. 361/696

FOREIGN PATENT DOCUMENTS

| JP | H02-044728 U | 3/1990 |
| JP | 2001-125191 A | 5/2001 |
| JP | 2006-211091 A | 8/2006 |
| JP | 2007-281621 A | 10/2007 |
| JP | 2008-145534 A | 6/2008 |
| JP | 2009-055260 A | 3/2009 |
| JP | 2010-093797 A | 4/2010 |

* cited by examiner

Primary Examiner — Paul Berardesca
(74) Attorney, Agent, or Firm — Judge Patent Associates

(57) ABSTRACT

An imaging apparatus capable of reducing increase in the temperature of a supporting device coupling section is provided. The imaging apparatus includes a supporting device fixing portion having a screw hole to which a supporting device can be coupled, a supporting device receiving portion which has an exposed surface formed around the entrance of the screw hole and is configured to receive the supporting device, and an exterior section having an outer surface formed around an opening. The supporting device fixing portion and the supporting device receiving portion are formed as separate portions.

9 Claims, 10 Drawing Sheets

IMAGING APPARATUS WITH SUPPORTING DEVICE HAVING IMPROVED HEAT DISSIPATION

TECHNICAL FIELD

The present invention relates to an imaging apparatus to which a supporting device can be coupled.

BACKGROUND ART

As an imaging apparatus, for example, an interchangeable lens type digital camera is known (e.g., see Patent Literature 1). The camera described in Patent Literature 1 includes a lens unit and a camera body. The camera body includes an imaging element such as a CCD (Charge Coupled Device) image sensor, and a mirror box device located between the lens unit and the imaging element. The mirror box device guides light having passed through the lens unit, to the CCD image sensor or a prism. The light guided to the prism is guided to a finder by the prism.

The imaging apparatus described above may be provided with a supporting device coupling section for coupling a supporting device such as a tripod or a monopod. For example, an interchangeable lens type digital camera in which a supporting device coupling section is fixed to a bottom thereof is known. When a tripod for supporting a digital camera is coupled to the supporting device coupling section, an image can be taken while the attitude of the digital camera is stabilized.

CITATION LIST

Patent Literature

[PTL 1] Japanese Laid-Open Patent Publication No. 2006-211091

SUMMARY OF THE INVENTION

Problems to be Solved by the Invention

Conventionally, size reduction of imaging apparatuses are required. For example, for an interchangeable lens type digital camera, size reduction of the camera body is required. However, when the camera body is reduced in size, components are densely arranged. Thus, the distance between the supporting device coupling section and each of electronic components that generate heat, such as an imaging element and a substrate on which a camera controller is mounted, is small as compared to that in a conventional camera body.

Further, with enhancement of image quality, power consumption of an imaging element and a camera controller increases. Thus, amounts of heat generated by these electronic components increase. As a result, the heat generation densities around the electronic components increase, and heat generated by the electronic components may be transmitted to the supporting device coupling section to increase the temperature of the supporting device coupling section. Therefore, when a user touches the supporting device coupling section and senses the difference between the ambient temperature and the temperature of the supporting device coupling section, the user may feel discomfort. Meanwhile, in order to stably support the imaging apparatus with a supporting device, it is desirable to locate the supporting device near the supporting device coupling section that serves as a fulcrum. In other words, it is desirable that the supporting device coupling section is located at a position suitable for coupling the supporting device.

The present invention is an invention for preventing increase in the temperature of the supporting device coupling section which is caused by heat generation of the imaging element and the camera controller. Meanwhile, a structure for positively dissipating heat, which is generated by the imaging element and the camera controller, to the supporting device coupling section is proposed (e.g., Patent Literature 1). In Patent Literature 1, a heat dissipation structure is provided which includes: a heat sink located on a back surface of the imaging element; a heat dissipation path extending from the heat sink; and a heat dissipation portion that is connected to an end of the heat dissipation path and has a coupling hole as a screw hole that is to be screwed onto a male screw provided to the supporting device coupling section. When the heat dissipation structure in Patent Literature 1 is used, heat generated by the imaging element is transmitted directly to the supporting device coupling section via the heat sink located on the back surface of the imaging element and the heat dissipation path extending from the heat sink. Thus, the temperature of the imaging element decreases but the temperature of the supporting device coupling section increases.

Therefore, an object of the present invention is to provide an imaging apparatus that solves the conventional problem and that has a supporting device coupling section located at a position suitable for coupling a supporting device and can reduce increase in the temperature of the supporting device coupling section.

Solution to the Problems

The present invention is directed to an imaging apparatus to which a supporting device can be coupled. In order to achieve the object described above, the imaging apparatus of the present invention includes a supporting device coupling section to which the supporting device can be coupled. The supporting device coupling section includes a supporting device fixing portion having a screw hole to which the supporting device can be coupled, and a supporting device receiving portion exposed at a periphery of an opening formed in an exterior section having an outer surface. The supporting device fixing portion and the supporting device receiving portion are formed as different portions. The supporting device fixing portion and the supporting device receiving portion are separated from each other.

The supporting device receiving portion is located within the exterior section and fixed to a frame bottom surface portion located along a bottom surface of the exterior section. The supporting device fixing portion is located within the exterior section and fixed to a frame front surface portion located substantially parallel to a front surface of the exterior section. The frame front surface portion supports an imaging element which converts an optical image of an object into image data.

A first frame portion and a second frame portion which are fixed to the exterior section are provided within the exterior section, the supporting device fixing portion is integrally formed with the first frame portion, and the supporting device receiving portion is integrally formed with the second frame portion. The supporting device receiving portion and the supporting device come into contact with each other when the supporting device is coupled to the supporting device coupling section.

Advantageous Effects of the Invention

According to the above-described imaging apparatus according to the present invention, the supporting device fixing portion and the supporting device receiving portion are formed as different portions and are separated from each other. Thus, even when the temperature of the supporting device fixing portion to which the supporting device can be coupled is increased by heat generated by the imaging element and a camera controller, the temperature of the supporting device receiving portion which the user may touch while using the imaging apparatus does not increase. Therefore, the frequency with which the user touches the supporting device coupling section and senses the difference between the temperature of the supporting device coupling section and the ambient temperature is reduced. Due to this, the imaging apparatus has the supporting device coupling section located at a position suitable for coupling the supporting device and can reduce the possibility that the user will feel discomfort when touching the supporting device coupling section.

DESCRIPTION OF EMBODIMENTS

<1-1: Outline of Digital Camera>

Figure 1:
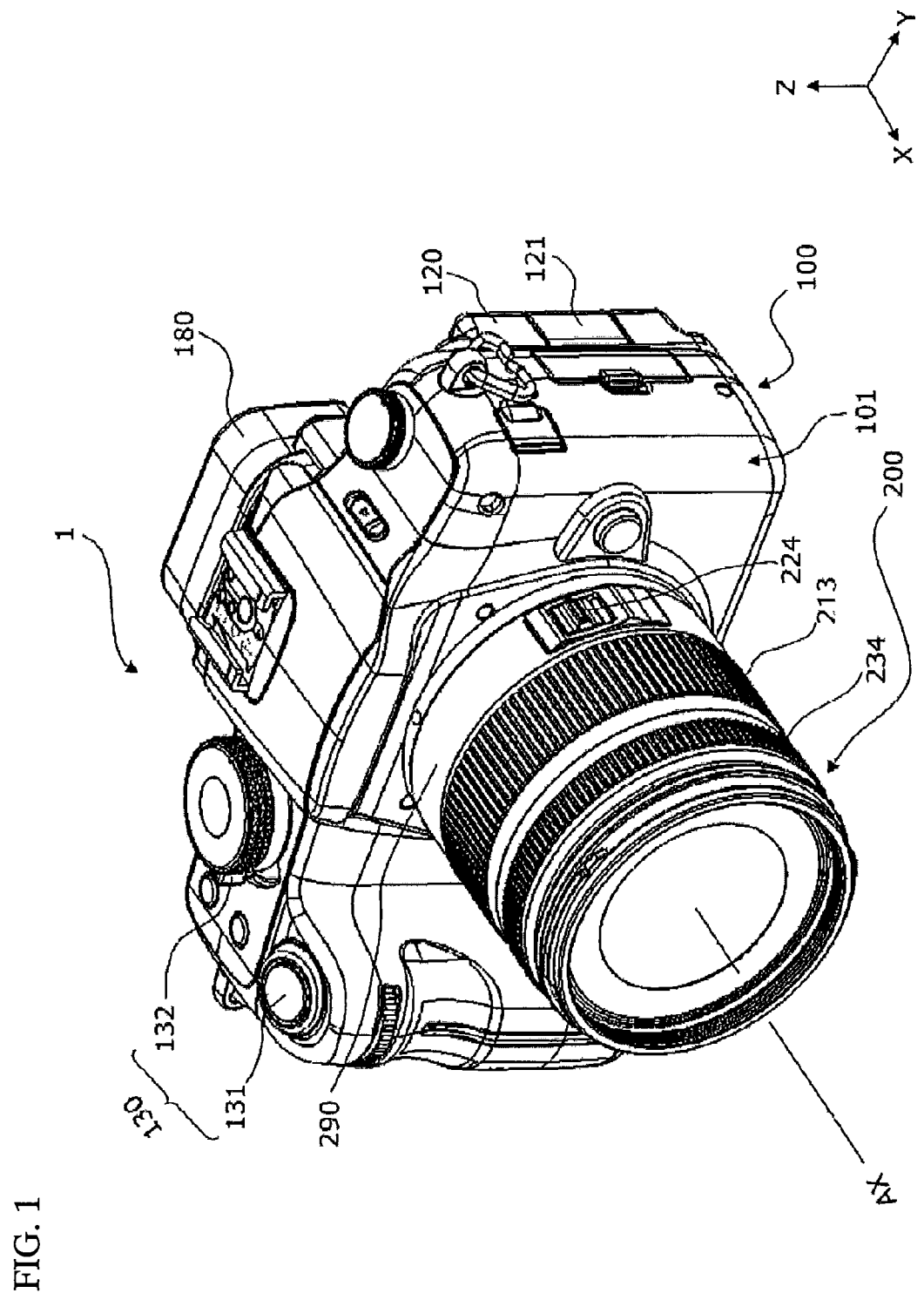
FIG. 1 is a perspective view of a digital camera 1.
Figure 2:
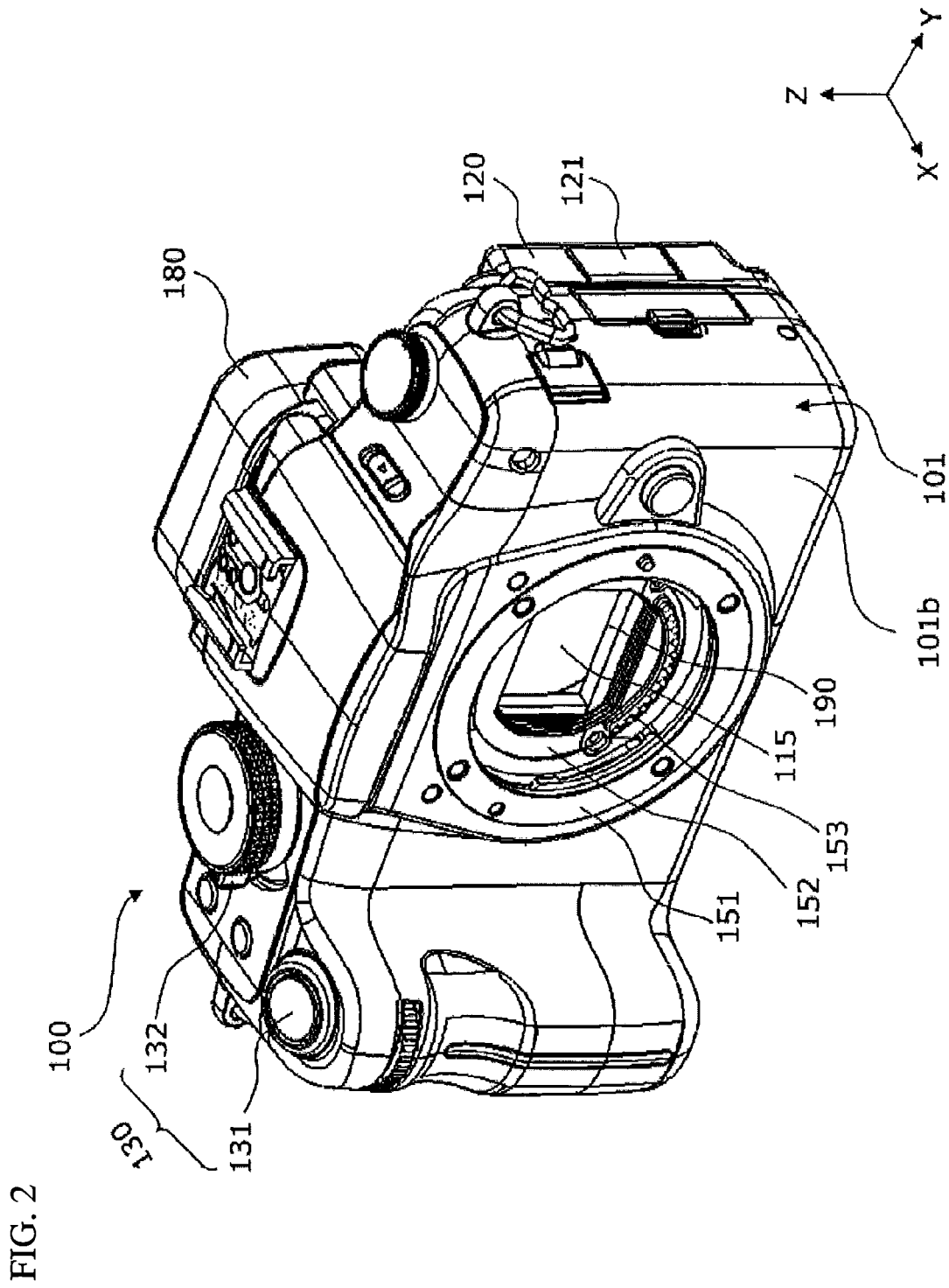
FIG. 2 is a perspective view of a camera body 100.
Figure 3:
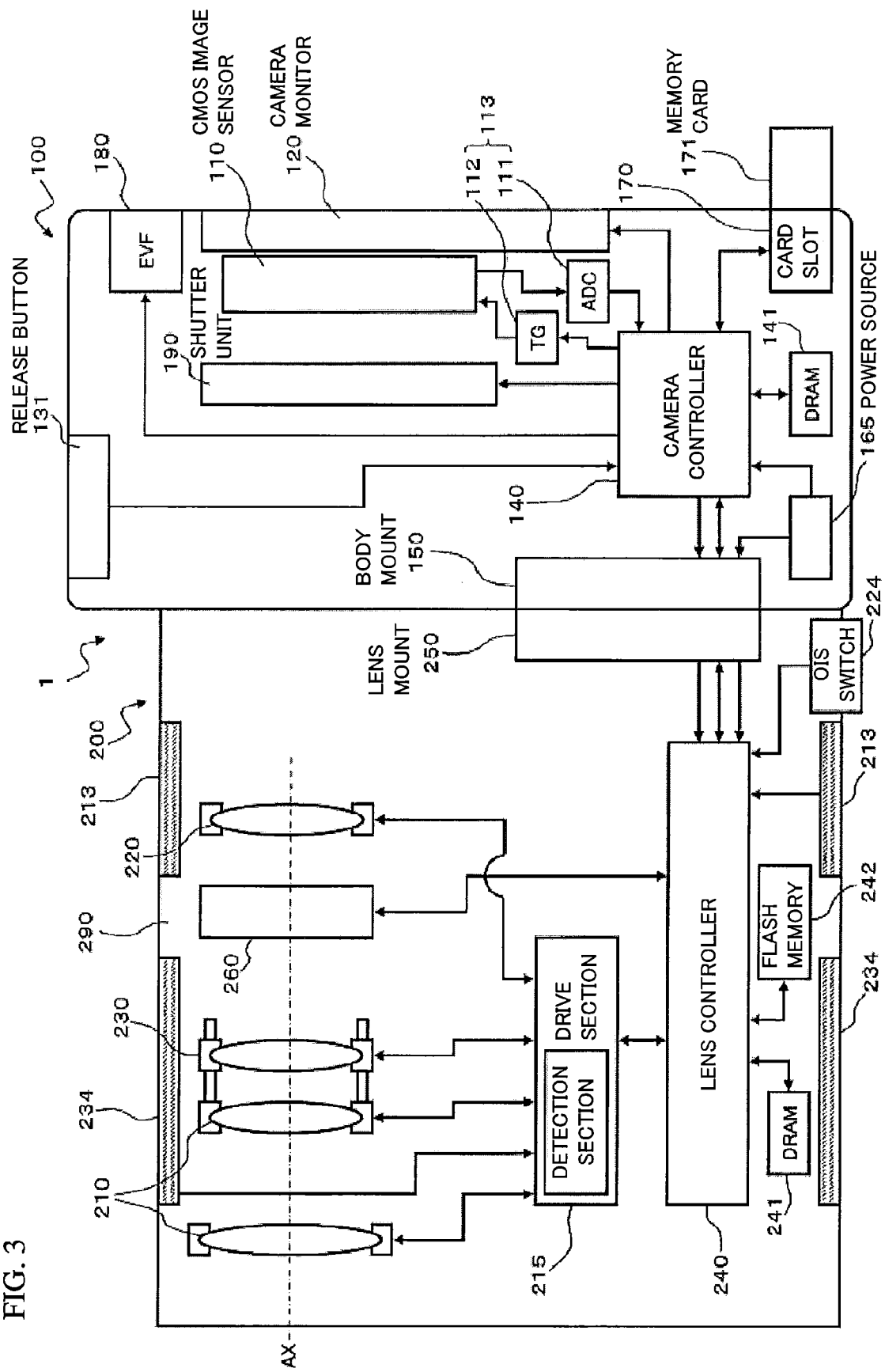
FIG. 3 is a block diagram of the digital camera 1.

FIG. 1 is a perspective view of a digital camera 1 (an example of an imaging apparatus) according to an embodiment of the present invention which has a camera body 100. FIG. 2 is a perspective view of the camera body 100. FIG. 3 is a functional block diagram of the digital camera 1.

Here, the imaging apparatus is not only an imaging apparatus capable of taking an image by itself but also a concept including a camera body. For example, the imaging apparatus includes the camera body of an interchangeable lens type camera to which a lens unit can be mounted. In addition, a supporting device is a fixing tool which is coupled to the imaging apparatus in order to stabilize the attitude of the imaging apparatus when an image is taken. As the supporting device, for example, a tripod and a monopod are considered.

The digital camera 1 is an interchangeable lens type digital camera for obtaining an image of an object, and includes the camera body 100 and a lens unit 200 which can be mounted to the camera body 100. Unlike a single-lens reflex camera, the camera body 100 does not include a mirror box device, and thus the flange back is small as compared to that in a conventional single-lens reflex camera. In addition, by decreasing the flange back, the camera body 100 is reduced in size. Further, by decreasing the flange back, flexibility in designing an optical system is increased, and thus the lens unit 200 is reduced in size. Hereinafter, each component will be described in detail.

For convenience of explanation, the object side of the digital camera 1 is referred to as front, the imaging surface side of the digital camera 1 is referred to as back, the vertical upper side in a normal attitude (hereinafter, also referred to as horizontal shooting attitude) of the digital camera 1 is referred to as up or upper side, and the vertical lower side is referred to as down or lower side. Here, the horizontal shooting attitude is an attitude in which when a direction parallel to the long sides of a horizontally oriented rectangular image coincides with the horizontal direction of an object within the image and a direction parallel to the short sides of the image coincides with the vertical direction of the object within the image, a direction in which a release button 131 (FIG. 1) is pressed when an image is taken substantially coincides with the vertical direction.

Additionally, the right side when the digital camera 1 is seen from a side opposite to an object in the horizontal shooting attitude of the digital camera 1 is referred to as right or right side. Similarly, the left side when the digital camera 1 is seen from the side opposite to the object in the horizontal shooting attitude of the digital camera 1 is referred to as left or left side. Further, the vertical direction in the horizontal shooting attitude of the digital camera 1 is referred to as up-down direction or height direction. Similarly, the direction of right and left in the horizontal shooting attitude of the digital camera 1 is referred to as right-left direction or lateral direction. Moreover, the direction perpendicular to the up-down direction and the right-left direction coincides with the front-back direction, a direction toward the object is referred to as forward direction, and the direction opposite to the forward direction is referred to as a backward direction.

Hereinafter, three-dimensional coordinate axes are set as shown in FIG. 1. In FIG. 1, an X-axis direction coincides with the front-back direction, a Y-axis direction coincides with the right-left direction, and a Z-axis direction coincides with the up-down direction. In addition, coordinate axes shown in the drawings other than FIG. 1 are based on the three-dimensional coordinate axes that are set in FIG. 1.

<1-2: Configuration of Camera Body>

Figure 4:
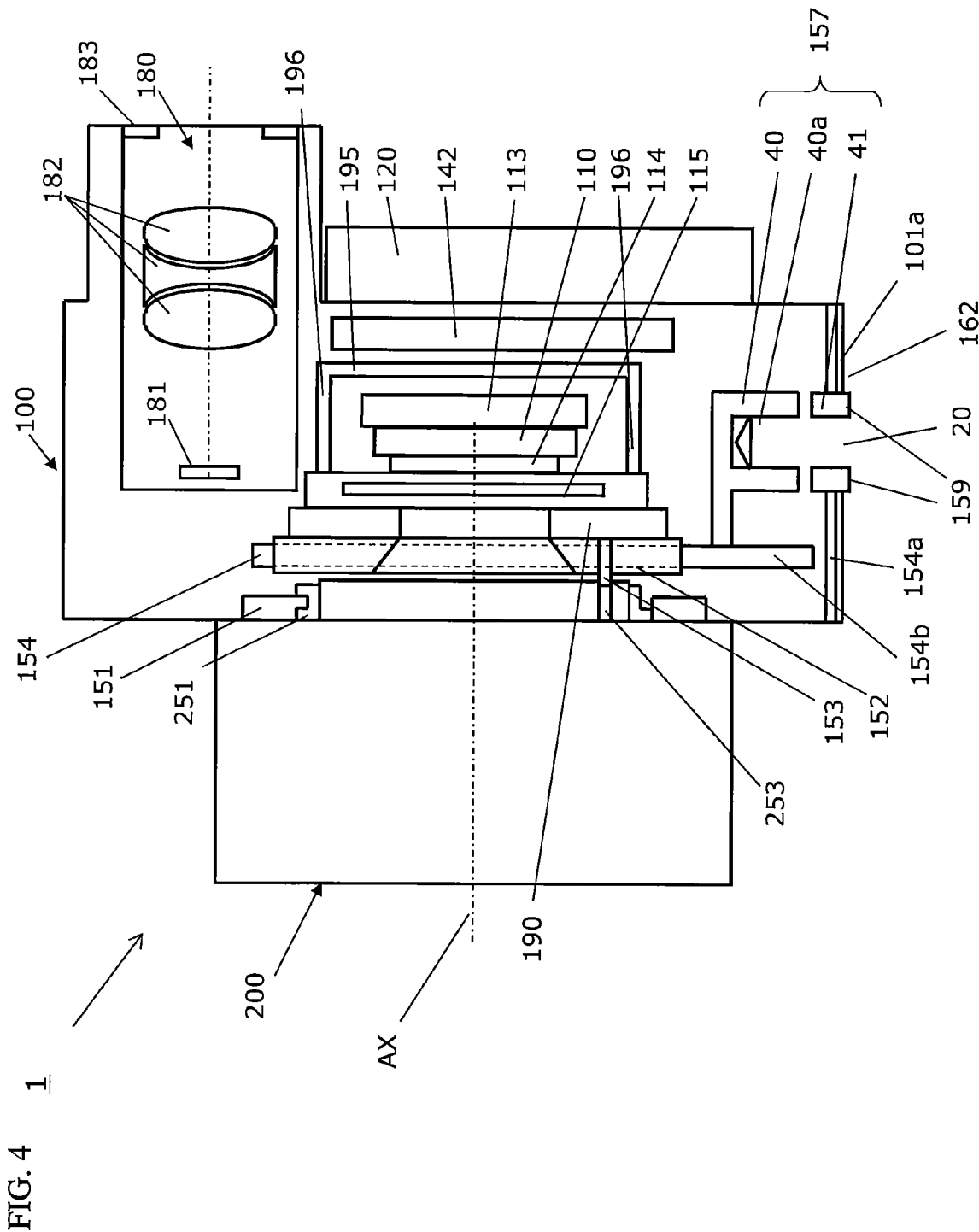
FIG. 4 is a schematic cross-sectional view of the digital camera 1.
Figure 5:
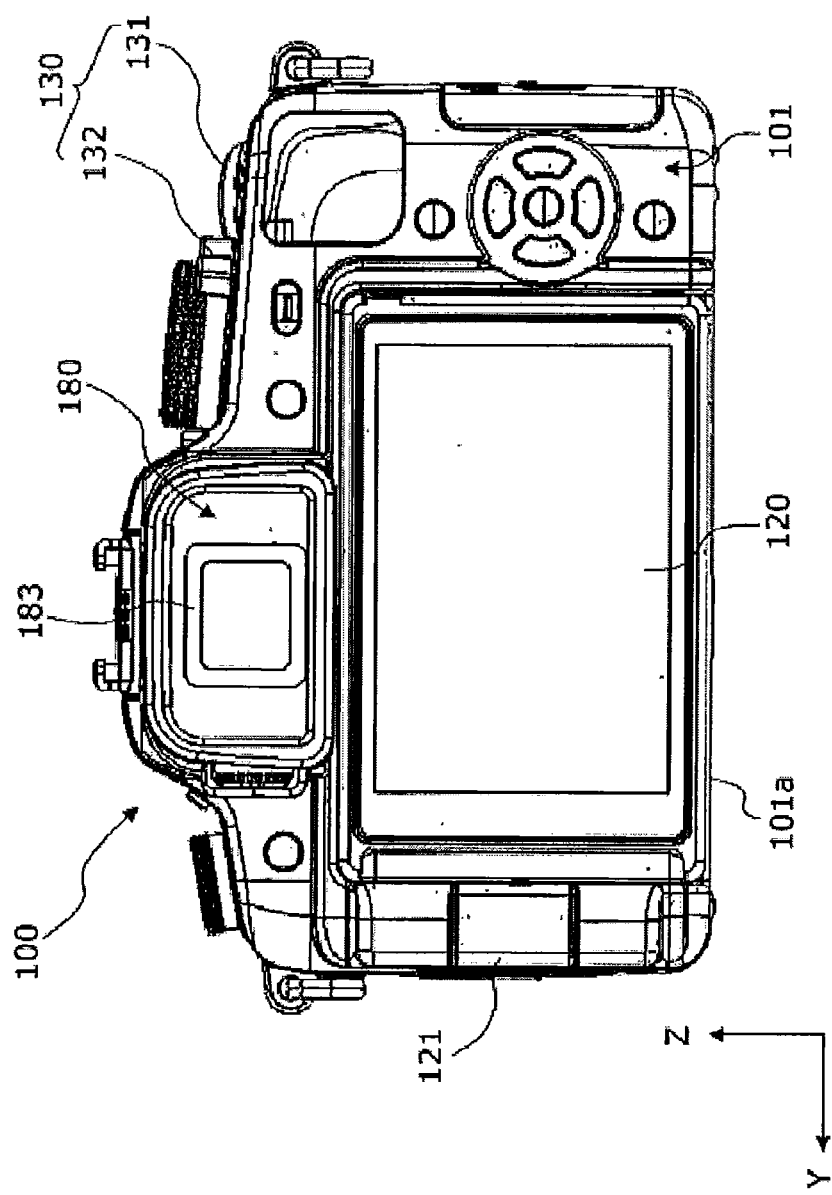
FIG. 5 is a back view of the camera body 100.

FIG. 4 is a schematic cross-sectional view of the digital camera 1. FIG. 5 is a back view of the camera body 100. The camera body 100 (an example of the imaging apparatus) mainly includes a CMOS (Complementary Metal Oxide Semiconductor) image sensor 110, a CMOS circuit substrate 113, a camera monitor 120, an operation section 130, a main circuit substrate 142 including a camera controller 140, a body mount 150, a power source 165, a card slot 170, an electric viewfinder (hereinafter, also referred to as EVF) 180, a shutter unit 190, an optical low-pass filter 114, a vibrating plate 115, a main frame 154, a supporting device coupling section 157, a heat dissipation member 198, and an exterior section 101.

<<Exterior Section>>

The exterior section 101 is a member that forms an outer surface of the camera body 100, and includes an exterior bottom portion 101a, an exterior front portion 101b, and an exterior back portion 101c. The exterior bottom portion 101a is located on the lower side of the CMOS image sensor 110 in the horizontal shooting attitude, the exterior front portion 101b is located on the object side, and the exterior back portion 101c is located on the photographer side.

In the camera body 100, the body mount 150, the shutter unit 190, the vibrating plate 115, the optical low-pass filter 114, the CMOS image sensor 110, the CMOS circuit substrate 113, a heat sink 195, the main circuit substrate 142, and the camera monitor 120 are located in order from front. In addition, a part of the main frame 154 is located at such a position as to overlap the body mount 150 in a direction parallel to an optical axis AX (hereinafter, also referred to as optical axis direction).

<<CMOS Image Sensor>>

The CMOS image sensor 110 converts an optical image (hereinafter, also referred to as object image) of an object incident through the lens unit 200, into image data. The generated image data is digitized by an AD converter 111 of the CMOS circuit substrate 113. The image data digitized by the AD converter 111 is subjected to various image processing by the camera controller 140. The various image processing is, for example, gamma correction processing, white balance adjustment processing, scratch correction processing, YC conversion processing, electronic zoom processing, JPEG compression processing, and the like. It should be noted that the function of the CMOS circuit substrate 113 may be included in the CMOS image sensor 110 or the main circuit substrate 142.

The CMOS image sensor 110 operates on the basis of a timing signal generated by a timing generator 112 of the CMOS circuit substrate 113. The CMOS image sensor 110 obtains still image data and moving image data under control of the CMOS circuit substrate 113. The obtained moving image data is also used for displaying a through-the-lens image. The still image data and the moving image data are examples of image data. Here, the through-the-lens image is an image of which data among the moving image data is not recorded in a memory card 171. The through-the-lens image is mainly a moving image and is displayed on the camera monitor 120 and/or the electric viewfinder 180 in order to determine the composition of a moving image or a still image.

The CMOS image sensor 110 is capable of obtaining a low-resolution moving image used as a through-the-lens image and obtaining a high-resolution moving image used for recording. As the high-resolution moving image, for example, a moving image having an HD size (high-vision size: 1920×1080 pixels) is considered. The CMOS image sensor 110 is an example of an imaging element which converts an optical image of an object into an electric image signal. As described above, the imaging element is an electronic component which generates an electric signal representing an image, and is a concept including the CMOS image sensor 110 as well as a photoelectric conversion element such as a CCD image sensor.

The CMOS circuit substrate 113 is a circuit substrate which controls the CMOS image sensor 110. In addition, the CMOS circuit substrate 113 is a circuit substrate which performs a predetermined process on image data outputted from the CMOS image sensor 110. The CMOS circuit substrate 113 includes the timing generator 112 and the AD converter 111. The CMOS circuit substrate 113 is an example of an imaging element circuit substrate which controls driving of the imaging element and performs a predetermined process such as AD conversion on image data outputted from the imaging element.

<<Camera Monitor>>

The camera monitor 120 is, for example, a liquid crystal display, and displays image and the like indicated by display image data. The display image data is generated by the camera controller 140. The display image data is, for example, image data subjected to image processing and data for displaying imaging conditions of the digital camera 1, an operation menu, and the like as an image. The camera monitor 120 is capable of selectively displaying a moving image and a still image.

The camera monitor 120 is provided to the camera body 100. In the present embodiment, the camera monitor 120 is located on the back surface of the camera body 100 but may be located at any position in the camera body 100. The angle of the display surface of the camera monitor 120 with respect to the camera body 100 is changeable. Specifically, as shown in FIG. 5, the camera body 100 includes a hinge 121 which pivotally connects the camera monitor 120 to the exterior section 101. The hinge 121 is located at the left edge of the exterior section 101. More specifically, the hinge 121 includes a first hinge and a second hinge. The camera monitor 120 is pivotable about the first hinge with respect to the exterior section 101 in the right-left direction, and is also pivotable about the second hinge with respect to the exterior section 101 in the up-down direction.

The camera monitor 120 is an example of a display section provided to the camera body 100. As the display section, a component that can display an image, such as an organic EL panel, an inorganic EL panel, or a plasma display panel, can also be used. In addition, the display section may be provided not on the back surface of the camera body 100 but on another location such as a side surface or an upper surface of the camera body 100.

<<Electric Viewfinder>>

The electric viewfinder (EVF) 180 displays an image and the like indicated by display image data that is created by the camera controller 140. The EVF 180 is capable of selectively displaying a moving image and a still image. In addition, the EVF 180 and the camera monitor 120 may display the same content and may display different contents. They are controlled by the camera controller 140. The EVF 180 includes an EVF crystal liquid monitor 181 which displays an image and the like, an EVF optical system 182 which enlarges a display of the EVF crystal liquid monitor 181, and an eyepiece window 183 to which a user makes their eye get close.

The EVF 180 is also an example of the display section. The difference from the camera monitor 120 is that the user makes their eye get close to the EVF 180 and looks at the EVF 180. The difference in structure is that the EVF 180 includes the eyepiece window 183 while the camera monitor 120 does not include the eyepiece window 183.

The EVF crystal liquid monitor 181 ensures a desired display brightness by providing a back light (not shown) in the case of a transmission type crystal liquid monitor and by providing a front light (not shown) in the case of a reflection type crystal liquid monitor. The EVF crystal liquid monitor 181 is an example of an EVF monitor. As the EVF monitor, a component that can display an image, such as an organic EL panel, an inorganic EL panel, or a plasma display panel, can also be used. In the case of a light-emitting device such as an organic EL panel, an illuminating light source is not necessary.

<<Operation Section>>

The operation section 130 receives an operation performed by the user. Specifically, as shown in FIGS. 1 and 2, the operation section 130 includes the release button 131 which receives a shutter operation performed by the user, and a power switch 132 which is a rotary dial switch provided on the upper surface of the camera body 100. The power switch 132 turns the power OFF at a first rotation position and turns the power ON at a second rotation position. The operation section 130 suffices to be capable of receiving an operation performed by the user, and includes a button, a lever, a dial, and a touch panel.

<<Camera Controller>>

The camera controller 140 is a device which serves as the functional center of the camera body 100, and controls each component of the camera body 100. For example, the camera controller 140 controls the shutter unit 190 such that the shutter unit 190 is kept in an open state when supply of power from the power source 165 is stopped. In addition, the camera controller 140 receives an instruction from the operation section 130. The camera controller 140 transmits a signal for controlling the lens unit 200, via the body mount 150 and a lens mount 250 to a lens controller 240 to indirectly control each component of the lens unit 200. In other words, the camera controller 140 controls the entirety of the digital camera 1.

Further, the camera controller 140 receives various signals via the body mount 150 and the lens mount 250 from the lens controller 240. The camera controller 140 uses a DRAM 141 as a work memory during a control operation or an image processing operation. The camera controller 140 is an example of a body control section (or a body microcomputer). The camera controller 140 is located on the main circuit substrate 142.

<<Card Slot and Memory Card>>

The memory card 171 is attachable to the card slot 170. The card slot 170 controls the memory card 171 on the basis of a control signal transmitted from the camera controller 140. Specifically, the card slot 170 stores still image data in the memory card 171. The card slot 170 outputs still image data from the memory card 171. In addition, the card slot 170 stores moving image data in the memory card 171. The card slot 170 outputs moving image data from the memory card 171.

The memory card 171 is capable of storing image data that the camera controller 140 generates by image processing. For example, the memory card 171 can store an uncompressed RAW image file and a compressed JPEG image file. In addition, the memory card 171 can output image data or image file previously stored therein, via the card slot 170. The image data or image file outputted from the memory card 171 is subjected to image processing by the camera controller 140. For example, the camera controller 140 performs extension processing on the image data or image file obtained from the memory card 171, to generate display image data.

The memory card 171 is further capable of storing moving image data that the camera controller 140 generates by image processing. For example, the memory card 171 can store a moving image file compressed according to H.264/AVC, which is a moving image compression standard. In addition, the memory card 171 can output moving image data or moving image file previously stored therein, via the card slot 170. The moving image data or moving image file outputted from the memory card 171 is subjected to image processing by the camera controller 140. For example, the camera controller 140 performs extension processing on the moving image data or moving image file obtained from the memory card 171, to generate display moving image data.

The memory card 171 is an example of a storage section. The storage section may be attachable to the camera body 100 like the memory card 171 or may be fixed to the digital camera 1.

<<Power Source>>

The power source 165 supplies power that is to be used in the digital camera 1, to each component. The power source 165 may be, for example, a dry battery or a rechargeable battery. Alternatively, the power source 165 may be a unit which receives power supplied from the outside via a power source cord or the like and supplies the power to the digital camera 1.

<<Body Mount>>

The lens unit 200 can be mounted to the body mount 150, and the body mount 150 includes a body mount ring 151 and an electric contact 153. The body mount 150 is mechanically and electrically connectable to the lens mount 250 of the lens unit 200.

The body mount ring 151 is a ring-shaped member provided to the exterior front portion 101b of the exterior section 101, and is engaged with a lens mount ring 251 provided in the lens unit 200, to mechanically support the lens unit 200. The lens mount ring 251 is engaged with the body mount ring 151 by a so-called bayonet mechanism. Specifically, depending on a rotation position relation about the optical axis between the lens mount ring 251 and the body mount ring 151, the lens mount ring 251 can be in a first state where the lens mount ring 251 is not engaged with the body mount ring 151 or in a second state where the lens mount ring 251 is engaged with the body mount ring 151.

More specifically, the lens mount ring 251 can be in the first state where the lens mount ring 251 is moveable in the optical axis direction with respect to the body mount ring 151. In such a first state, the lens mount ring 251 is capable of being inserted into the body mount ring 151. When the lens mount ring 251 is rotated with respect to the body mount ring 151 in the state of being inserted into the body mount ring 151, the lens mount ring 251 comes into engagement with the body mount ring 151. The rotation position relation between the body mount ring 151 and the lens mount ring 251 at that time is the second state.

In order to support the lens mount ring 251, the body mount ring 151 is required to have strength. Thus, the body mount ring 151 is preferably formed from metal. In the present embodiment, the body mount ring 151 is formed from metal.

In a state where the lens unit 200 is mounted to the camera body 100, the electric contact 153 is in contact with an electric contact 253 of the lens mount 250. In this manner, the body mount 150 and the lens mount 250 are electrically connectable to each other via the electric contact 153 of the body mount 150 and the electric contact 253 of the lens mount 250. Therefore, the digital camera 1 can transmit and receive at least either one of data or a control signal between the camera body 100 and the lens unit 200 via the body mount 150 and the lens mount 250. Specifically, the body mount 150 and the lens mount 250 can transmit and receive at least either one of data or a control signal between the camera controller 140 and the lens controller 240 included in the lens unit 200. In addition, the body mount 150 supplies the power received from the power source 165, to the entirety of the lens unit 200 via the lens mount 250.

The body mount 150 is supported by the main frame 154 via a body mount support portion 152. More specifically, the body mount support portion 152 is connected to the body mount ring 151 to support the body mount ring 151.

The body mount support portion 152 is supported by the main frame 154 and located between the body mount ring 151 and the shutter unit 190.

<<Shutter Unit>>

The shutter unit 190 is a so-called focal plane shutter, and is capable of blocking light to the CMOS image sensor 110. The shutter unit 190 is located between the body mount 150 and the CMOS image sensor 110. The shutter unit 190 includes a back screen, a front screen, and a shutter support frame. The shutter support frame is provided with an opening through which light guided from an object to the CMOS image sensor 110 passes. The shutter unit 190 adjusts an exposure time of the CMOS image sensor 110 by moving the back screen and the front screen toward or away from the opening of the shutter support frame. The shutter unit 190 can mechanically keep an open state. Mechanically keeping is a concept of keeping the open state without using electric power and includes, for example, keeping the open state by an engagement between a member and a member or by a permanent magnet.

<<Optical Low-Pass Filter and Diaphragm>>

The optical low-pass filter 114 removes a high-frequency component of light incident from an object. Specifically, the optical low-pass filter 114 separates an object image formed by the lens unit 200, such that the resolution is coarser than the pitch of the pixels of the CMOS image sensor 110. In general, in the imaging element such as the CMOS image sensor 110, color filters of RGB colors called Bayer arrangement or complementary color filters of YCM colors are arranged for each pixel. Therefore, when the object image is resolved to one pixel, false colors occur and a moiré phenomenon also occurs. The optical low-pass filter 114 also has an Ir cut filter function for cutting out infrared light.

The vibrating plate 115 is located in front of the CMOS image sensor 110, is supported by a vibrating plate support portion 116, and prevents dust from attaching to the CMOS image sensor 110. In addition, the vibrating plate 115 shakes off dust attached to the vibrating plate 115, by vibrations. Specifically, the vibrating plate 115 includes a transparent thin plate-shaped member, a piezoelectric element, and a fixing member which fixes the plate-shaped member via the piezoelectric element. When an alternating voltage is applied and the piezoelectric element vibrates, the plate-shaped member vibrates. The vibrating plate support portion 116 supports the vibrating plate 115 such that the vibrating plate 115 is located at a predetermined position with respect to the CMOS image sensor 110. The vibrating plate support portion 116 is supported by the main frame 154 via the body mount 150 and the shutter unit 190.

<<Heat Dissipation Member>>

The heat dissipation member 198 includes the heat sink 195 and a heat transmission portion 196. The heat sink 195 is located between the CMOS image sensor 110 and the main circuit substrate 142. Specifically, the heat sink 195 is located between the CMOS circuit substrate 113 and the main circuit substrate 142. The heat sink 195 is a rectangular plate-shaped member for dissipating heat generated by the CMOS image sensor 110. When metal such as aluminum or copper is used as the material of the heat sink 195, a preferable heat dissipation effect can be obtained.

The heat transmission portion 196 is connected to the heat sink 195 in order to transmit heat to the vibrating plate support portion 116. The heat transmission portion 196 is connected and fixed to the vibrating plate support portion 116. Heat generated by the CMOS image sensor 110 is transmitted via the heat sink 195 and the heat transmission portion 196 to the vibrating plate support portion 116. In order to enable such heat transmission, the heat sink 195 is located on the back surface of the CMOS image sensor 110 and the heat transmission portion 196 extends from the heat sink 195 to the vibrating plate support portion 116.

More specifically, the heat transmission portion 196 includes four plates extending forward from the upper and lower edges and the right and left edges of the heat sink 195. In other words, the heat transmission portion 196 is located so as to surround the upper, lower, right, and left portions of the CMOS image sensor 110. In this manner, the CMOS image sensor 110 is surrounded at the upper side, both lateral sides, the lower side, and the back side thereof by the heat sink 195 and the heat transmission portion 196.

The heat transmission portion 196 may not necessarily be connected to the vibrating plate support portion 116 and suffices to be connected to any component located between the main frame 154 and the CMOS image sensor 110. For example, it is considered that the heat transmission portion 196 is connected to the body mount support portion 152 or the shutter unit 190.

The heat transmission portion 196 is not necessarily connected at four locations to the vibrating plate support portion 116. For example, it suffices that at least one of the four plates connects the heat sink 195 to the vibrating plate support portion 116. However, in view of stability of the heat sink 195, the heat transmission portion 196 is desirably connected at three or more locations to the vibrating plate support portion 116.

<1-3: Configuration of Lens Unit>

The lens unit 200 can be mounted to the camera body 100, and forms an optical image of an object. The lens unit 200 mainly includes an optical system L, a drive section 215, the lens controller 240, the lens mount 250, a diaphragm unit 260, and a lens barrel 290.

The optical system L includes a zoom lens unit 210 for changing a focal distance of the optical system L, an OIS (Optical Image Stabilizer) lens unit 220 for reducing blur of an object image formed by the optical system L with respect to the CMOS image sensor 110, and a focus lens unit 230 for changing a focus state of an object image formed by the optical system L on the CMOS image sensor 110.

The diaphragm unit 260 is a light amount adjustment member which adjusts an amount of light passing through the optical system L. Specifically, the diaphragm unit 260 includes diaphragm blades (not shown) capable of blocking a part of a beam of light passing through the optical system L, and a diaphragm drive section (not shown) which drives the diaphragm blades.

The drive section 215 drives each lens unit (the zoom lens unit 210, the OIS lens unit 220, and the focus lens unit 230) of the optical system L on the basis of a control signal from the lens controller 240. In addition, the drive section 215 includes a detection section for detecting the position of each lens unit of the optical system L.

The lens mount 250 includes the lens mount ring 251 (not shown) and the electric contact 253 (not shown), and is mechanically and electrically connectable to the body mount 150 as described above.

The lens controller 240 controls the entirety of the lens unit 200 on the basis of a control signal transmitted from the camera controller 140. The lens controller 240 receives position information of each lens unit of the optical system L which is detected by the detection section included in the drive section 215, and transmits the position information to the camera controller 140. The camera controller 140 generates a control signal for controlling the drive section 215, on the basis of the received position information, and transmits the control signal to the lens controller 240. The lens controller 240 transmits the control signal generated by the camera controller 140, to the drive section 215. The drive section 215 adjusts the positions of the zoom lens unit 210, the OIS lens unit 220, and the focus lens unit 230 on the basis of the control signal. Meanwhile, the camera controller 140 generates a control signal for operating the diaphragm unit 260, on the basis of information such as an amount of light received by the CMOS image sensor 110, whether still image shooting or moving image shooting is performed, and whether or not an operation for preferentially setting the F-number has been performed. At that time, the lens controller 240 relays the control signal generated by the camera controller 140, to the diaphragm unit 260.

Further, the lens controller 240 uses a DRAM 241 as a work memory when driving each lens unit of the optical system L and the diaphragm unit 260. In addition, a flash memory 242 has stored therein programs and parameters which are used by the lens controller 240.

The lens barrel 290 mainly accommodates therein the optical system L, the lens controller 240, the lens mount 250, and the diaphragm unit 260. In addition, a zoom ring 213, a focus ring 234, and an OIS switch 224 are provided to the outside of the lens barrel 290.

The zoom ring 213 is a cylindrical member, and is rotatable on the outer circumferential surface of the lens barrel 290. The zoom ring 213 is an example of an operation section for controlling the focal distance. When the zoom ring 213 is rotated, the focal distance of the optical system L is set in accordance with the position of the zoom ring 213 after the rotation. The position of the zoom ring 213 is detected by, for example, the detection section included in the drive section 215.

The focus ring 234 is a cylindrical member, and is rotatable on the outer circumferential surface of the lens barrel 290. The focus ring 234 is an example of an operation section for controlling a focus state of an object image formed by the optical system L on the CMOS image sensor 110. When the focus ring 234 is rotated, the focus state of the object image is adjusted in accordance with the position of the focus ring 234 after the rotation. For example, the lens controller 240 generates a control signal on the basis of position information of the focus ring 234, and outputs the control signal to the drive section 215. The drive section 215 drives the focus lens unit 230 on the basis of the control signal.

The OIS switch 224 is an example of an operation section for controlling an OIS. When the OIS switch 224 is turned OFF, the OIS does not operate. When the OIS switch 224 is turned ON, the OIS becomes operable.

<1-4: Features of Structure>

The camera body 100 does not include a mirror box device, and differs from a single-lens reflex camera in this point. Hereinafter, the structural features of the camera body 100 will be described in more detail with reference to FIGS. 6A and 6B.

Figure 6B:
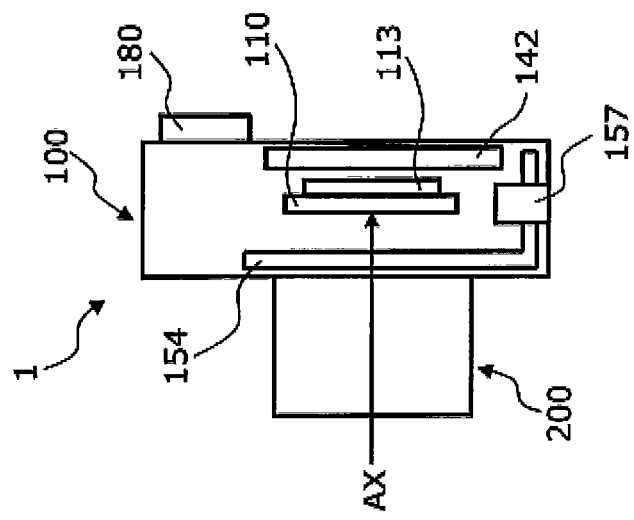
FIG. 6B is a schematic cross-sectional view of the digital camera 1.
Figure 6A:
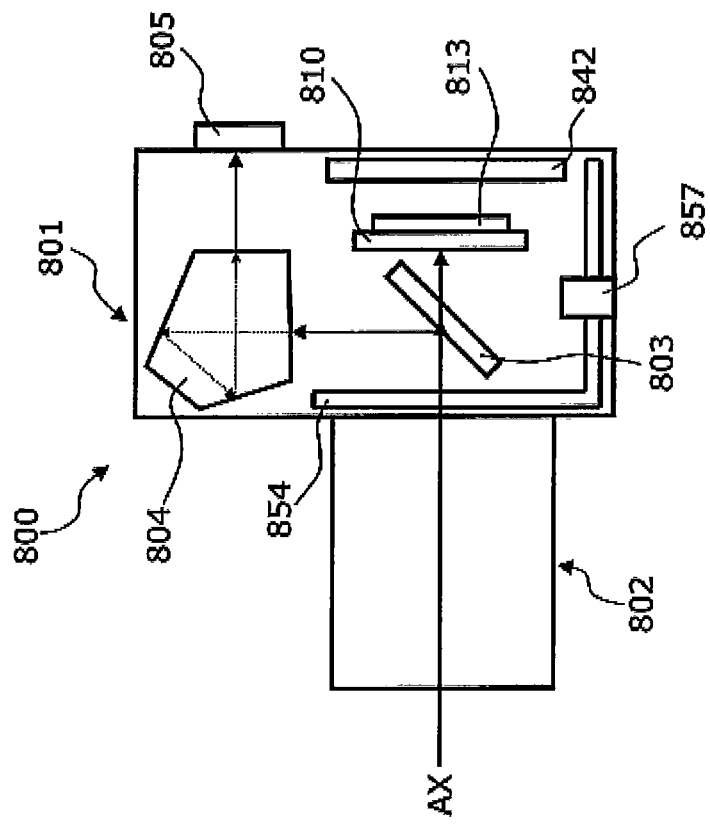
FIG. 6A is schematic cross-sectional view of a single-lens reflex camera 800.

FIG. 6A is a schematic cross-sectional view of a single-lens reflex camera 800. FIG. 6B is a schematic cross-sectional view of the digital camera 1 of the present embodiment. In FIG. 6B, components, such as the body mount 150, the shutter unit 190, the vibrating plate 115, the vibrating plate support portion 116, the heat sink 195, and the heat transmission portion 196, are omitted. In addition, in FIG. 6B, the details of a structure around the supporting device coupling section 157 are also omitted.

In the single-lens reflex camera 800 shown in FIG. 6A, a mirror box device is located in front of a CMOS image sensor 810, namely, with respect to a lens unit 802 side of the CMOS image sensor 810. The mirror box device includes a reflection mirror 803 and a pentaprism 804. On the back surface of the CMOS image sensor 810 (namely, on the opposite side of the CMOS image sensor 810 with respect to the lens unit 802), a CMOS circuit substrate 813 and a main circuit substrate 842 including a camera controller 840 are located in order from front. In addition, a main frame 854 made of metal is located along an inner surface of front and bottom portions of a camera body 801 in order to ensure desired strength of the camera body 801. Moreover, a supporting device coupling section 857 is provided at the bottom surface of the camera body 801 and fixed to the main frame 854.

In the single-lens reflex camera 800, an optical image of an object formed by the lens unit 802 is guided to the CMOS image sensor 810 or an optical finder 805 by the reflection mirror 803 and the pentaprism 804 included in the mirror box device. As described above, a space for locating the moveable reflection mirror 803 and the pentaprism 804 and a space for an optical path from the reflection mirror 803 to the optical finder 805 need to be ensured within the camera body 801, and thus the camera body 801 is not suitable for size reduction.

On the other hand, due to the reasons such as many spaces within the camera body 801 and a large surface area of the camera body 801, it is easy to dissipate heat generated by the CMOS image sensor 810 in the single-lens reflex camera 800. In addition, the supporting device coupling section 857 can be located at a position distant from the CMOS image sensor 810, and thus it is relatively difficult to transmit heat generated by the CMOS image sensor 810, to the supporting device coupling section 857.

Meanwhile, as shown in FIG. 6B, in the digital camera 1 according to the present embodiment, a mirror box device is not located on the front side of the CMOS image sensor 110. Thus, it is possible to shorten the flange back, and hence it is possible to reduce the camera body 100 in size. In addition, since the flange back is short, flexibility in designing the optical system L is increased, and thus it is possible to reduce the lens unit 200 in size. Therefore, omission of a mirror box device allows the digital camera 1 to be reduced in size.

On the other hand, although the camera body 100 can be reduced in size since a space in which a mirror box device is provided as in the single-lens reflex camera 800 is unnecessary, components are densely arranged in the digital camera 1. Thus, the distance between the CMOS image sensor 110 and the supporting device coupling section 157 is relatively small as compared to that in the single-lens reflex camera 800. In addition, power consumption of the CMOS image sensor 110 and the camera controller 140 is increased in order to enhance image quality and to support moving image shooting, and thus amounts of heat generated by the CMOS image sensor 110 and the camera controller 140 increase.

For example, the CMOS image sensor 110 which also supports taking a high-resolution moving image is used in the digital camera 1, and thus the power consumption thereof increases by about three times (from 0.4 W to 1.2 W) as compared to that of a CMOS image sensor that does not support taking a high-resolution moving image (for example, the CMOS image sensor 810 of the single-lens reflex camera 800). As a result, the amount of heat generated by the CMOS image sensor 110 increases as compared to an amount of heat generated by a CMOS image sensor that does not support taking a high-resolution moving image.

As described above, in the digital camera 1, amounts of heat generated by electronic components such as the CMOS image sensor 110 and the camera controller 140 increase as compared to those in the single-lens reflex camera 800. In addition, with size reduction, the supporting device coupling section 157 is located close to the CMOS image sensor 110. Thus, it is easy to transmit heat generated by the CMOS image sensor 110, to the supporting device coupling section 157. Therefore, the user who touches the supporting device coupling section 157 and senses the difference between the ambient temperature and the temperature of the supporting device coupling section 157, may feel discomfort.

For that reason, in the digital camera 1 according to the present embodiment, the supporting device coupling section 157 has such a structure that when the user touches an exposed surface 159 of a supporting device receiving portion 41 constituting the supporting device coupling section 157, the user is less likely to feel discomfort due to a temperature difference from the ambient temperature. Hereinafter, the structure of the supporting device coupling section 157 of the present embodiment will be described.

Figure 7:
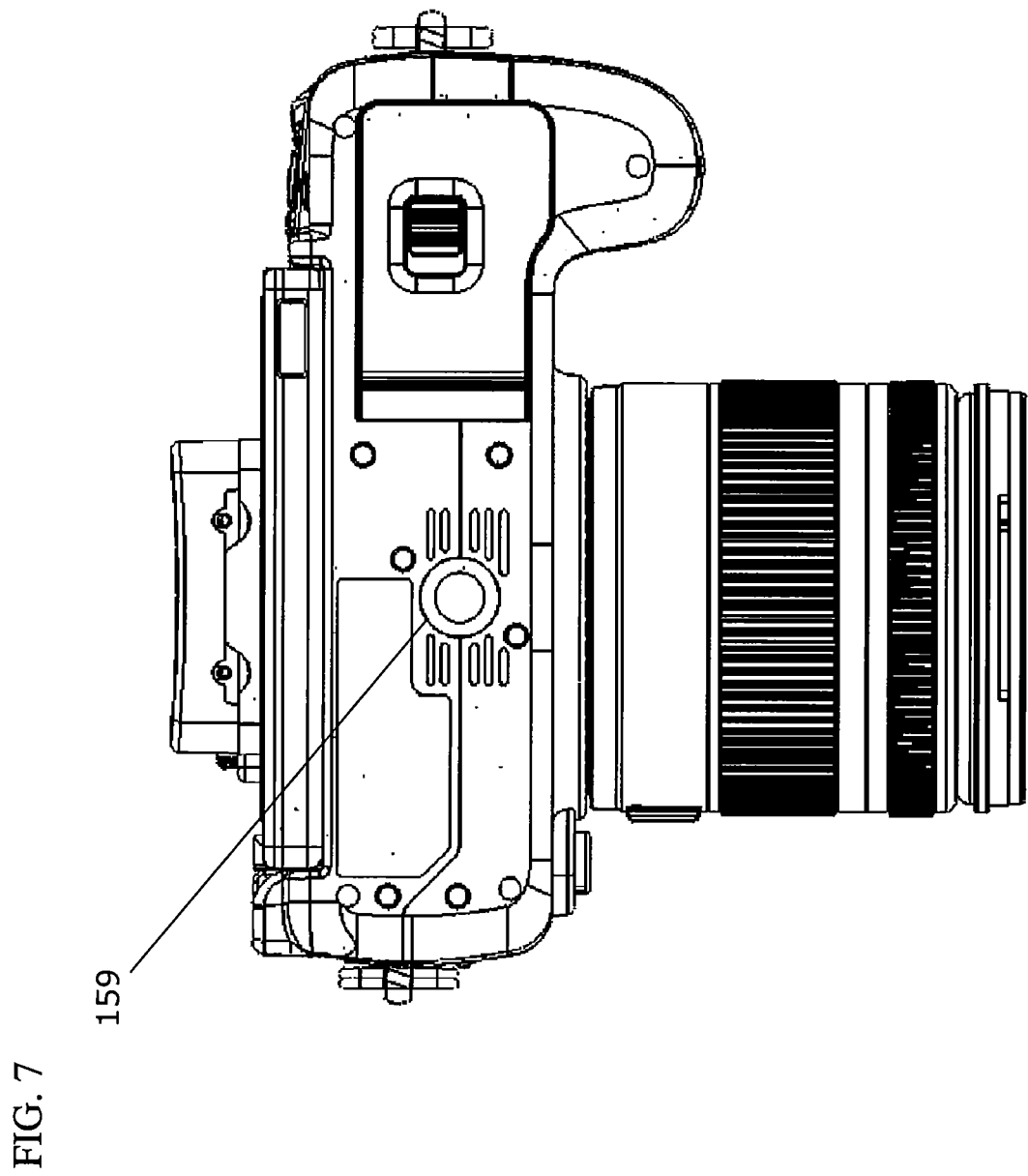
FIG. 7 is a diagram illustrating a bottom portion of the digital camera.
Figure 8:
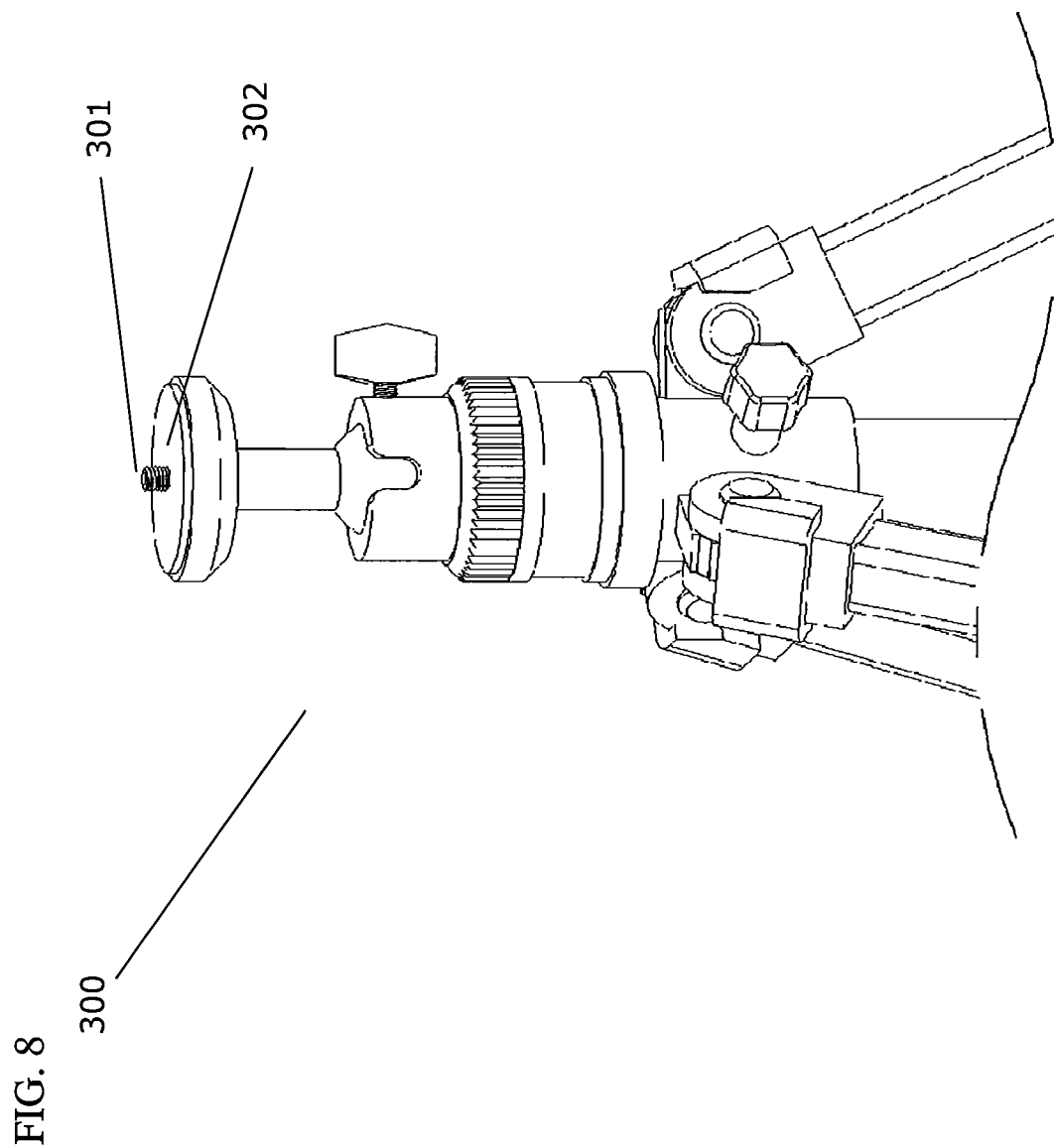
FIG. 8 is a diagram illustrating a supporting device.
Figure 9:
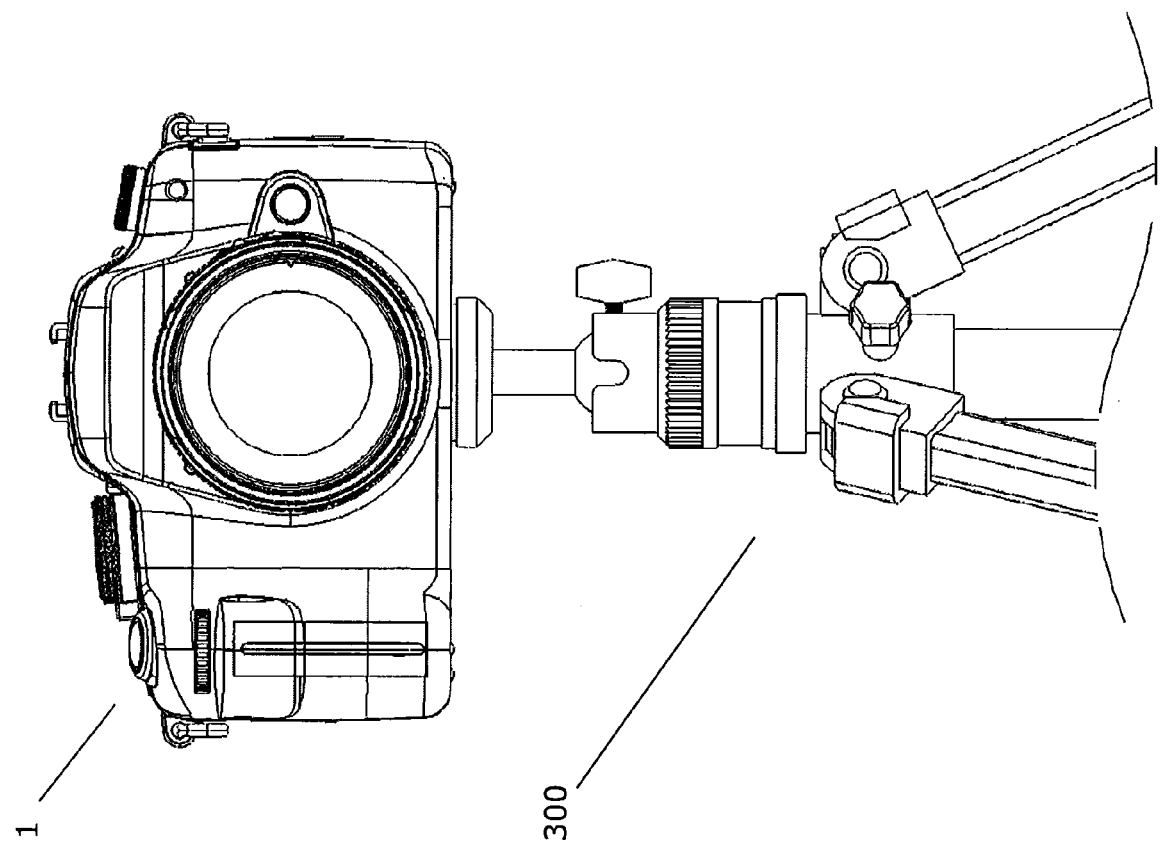
FIG. 9 is a diagram illustrating a state where the digital camera is mounted to the supporting device.
Figure 10A:
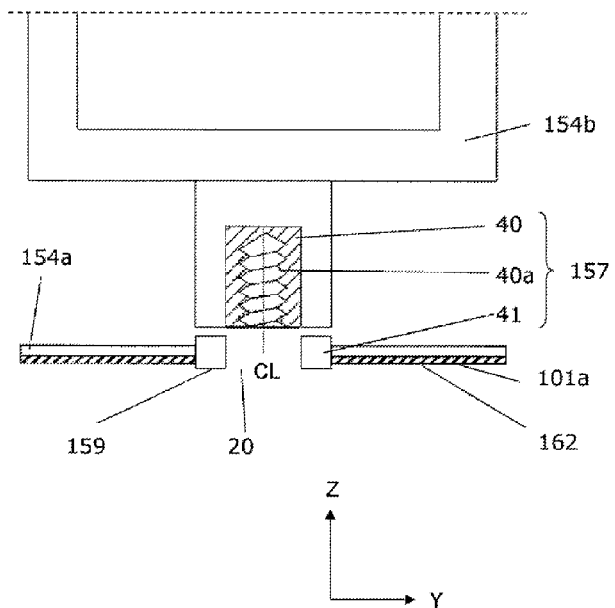
FIG. 10A is a cross-sectional view of a supporting device coupling section 157 (when the supporting device is not coupled thereto).
Figure 10B:
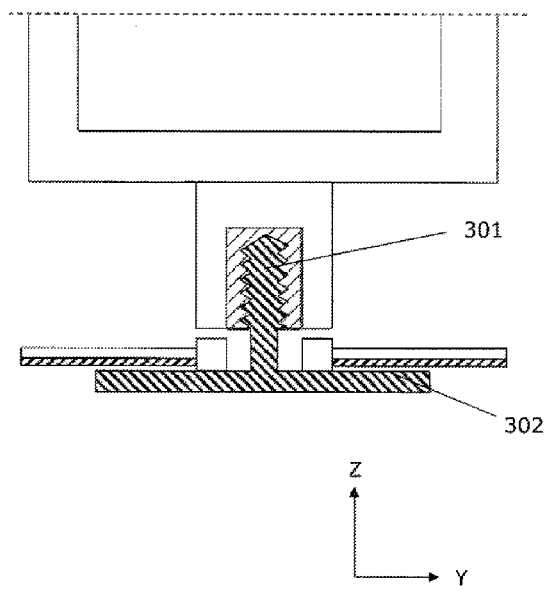
FIG. 10B is a cross-sectional view of the supporting device coupling section 157 (when the supporting device is coupled thereto).

FIG. 7 is a diagram illustrating a bottom portion of the digital camera 1 of the present embodiment. In addition, FIG. 8 is a diagram illustrating a tripod that is a general example of a supporting device 300. FIG. 9 is a diagram illustrating a state where the digital camera 1 of the present embodiment is mounted to the supporting device 300. Here, the supporting device 300 is a fixing tool which is coupled to an imaging apparatus in order to stabilize the attitude of the imaging apparatus when an image is taken. As the supporting device 300, for example, a tripod and a monopod are considered. FIG. 10A is a schematic diagram illustrating a structure around the supporting device coupling section 157 in a state where the supporting device is not coupled thereto. FIG. 10B is a diagram illustrating the structure around the supporting device coupling section 157 in a state where the supporting device is coupled thereto.

<<Supporting Device Coupling Section>>

As shown in FIGS. 10A and 10B, the supporting device coupling section 157 is a member for coupling the supporting device 300 such as a tripod or a monopod, and includes a supporting device fixing portion 40 having a screw hole 40a to which the supporting device 300 can be coupled, and the supporting device receiving portion 41 which is exposed at the periphery of an opening formed in the exterior section 101 for receiving the supporting device.

As described above, the exterior section 101 includes the exterior bottom portion 101a. In the exterior bottom portion 101a, an opening 20 is formed. At the periphery of the opening 20, the exposed surface 159 of the supporting device receiving portion 41 is exposed. The supporting device fixing portion 40 and the supporting device receiving portion 41 constituting the supporting device coupling section 157 are formed as different portions and fixed to different frames, respectively, so as to be separated from each other without contacting each other. Thus, a gap is formed between the supporting device fixing portion 40 and the supporting device receiving portion 41.

The exposed surface 159 of the supporting device receiving portion 41 and an outer surface 162 constitute a generally flat surface formed around the opening 20, and are exposed to the outside. In the present embodiment, when the supporting device 300 is coupled to the supporting device coupling section 157, the exposed surface 159 of the supporting device receiving portion 41 comes into contact with the supporting device 300.

The main frame 154 (an example of a frame) includes a frame bottom surface portion 154a and a frame front surface portion 154b, and is located within the exterior section 101 of the camera body 100. The main frame 154 is located along the exterior front portion 101b and the exterior bottom portion 101a within the camera body 100. More specifically, the frame front surface portion 154b is located along the exterior front portion 101b of the camera body 100, and the frame bottom surface portion 154a is located along the exterior bottom portion 101a of the camera body 100.

The frame front surface portion 154b supports the imaging element which converts an optical image of an object into image data. In addition, the frame front surface portion 154b is connected to the body mount support portion 152. In other words, the main frame 154 supports the lens unit 200 via the body mount 150 and the body mount support portion 152. Thus, the main frame 154 needs to have a certain level of strength. Therefore, the main frame 154 is preferably formed from metal. As the material of the main frame 154, for example, aluminum and a stainless alloy are considered.

The screw hole 40a to which the supporting device can be coupled is fixed to the main frame front surface portion 154b. In addition, the supporting device receiving portion 41 is fixed to the frame bottom surface portion 154a.

The user can fix the supporting device 300 to the imaging apparatus by inserting a screw portion 301 of the supporting device 300 into the screw hole 40a through the opening 20. The screw hole 40a has a center line CL. Hereinafter, a direction parallel to the center line CL is referred to as center line CL direction. As shown in FIGS. 10A and 10B, in the present embodiment, the center line CL direction substantially coincides with the Z-axis direction.

The screw portion 301 of the supporting device 300 is inserted into the screw hole 40a along the center line CL direction. A relatively great force is applied to the screw hole 40a via the screw portion 301 of the supporting device 300, and thus the supporting device coupling section 157 needs to have a certain level of strength. Therefore, the supporting device coupling section 157 is preferably formed from metal.

Meanwhile, in order to reduce increase in the temperature of the supporting device coupling section 157, the supporting device coupling section 157 is desirably formed from metal having a relatively low heat conductivity. As a material that satisfies these conditions regarding strength and heat conductivity, for example, a stainless alloy is considered.

As shown in FIG. 4, the supporting device coupling section 157 is located on the lower side of the CMOS image sensor 110 and aligned along the Z-axis direction with the CMOS image sensor 110. When the supporting device coupling section 157 is located as described above, even if a component having a relatively heavy weight (for example, the lens unit 200) is located around the CMOS image sensor 110, a bias is unlikely to occur in a weight distribution around the supporting device coupling section 157. As a result, the digital camera 1 is easily stabilized when the supporting device is coupled thereto.

In FIGS. 10A and 10B, the supporting device fixing portion 40 and the supporting device receiving portion 41 are different portions and separated from each other, and thus are not in contact with each other. In addition, the supporting device fixing portion 40 is fixed to the frame front surface portion 154b located within the exterior section 101. Meanwhile, the supporting device receiving portion 41 is fixed to the frame bottom surface portion 154a located within the exterior section 101. Since the supporting device fixing portion 40 and the supporting device receiving portion 41 are fixed to the different frames as described above, a structure is provided in which the supporting device fixing portion 40 and the supporting device receiving portion 41 are not directly in contact with each other.

Thus, even when heat generated by the CMOS image sensor 110 is transmitted to the supporting device coupling section 157 to increase the temperature of the supporting device fixing portion 40, since the supporting device fixing portion 40 is not connected to the supporting device receiving portion 41, increase in the temperature of the exposed surface 159 of the supporting device receiving portion 41 which the user may touch when using the imaging apparatus can be reduced.

As described above, in the digital camera 1 according to the present embodiment, since the supporting device coupling section 157 is located on the lower side of the CMOS image sensor 110, radiant heat and convective heat from the CMOS image sensor 110 are relatively easily transmitted to the supporting device coupling section 157. Therefore, in the digital camera 1, the temperature of the supporting device coupling section 157 easily increases. However, in the structure of the supporting device coupling section 157 of the present embodiment, the supporting device fixing portion 40 to which heat generated by the CMOS image sensor 110 is easily transmitted and the exposed surface 159 of the supporting device receiving portion 41 which the user may touch are separated from each other and further are not in contact with each other. Thus, heat is not transmitted directly between the supporting device fixing portion 40 and the exposed surface 159 of the supporting device receiving portion 41 and only heat transfer by radiation and convection occurs therebetween, and hence it is possible to decrease the temperature of the supporting device receiving portion 41 as compared to that of the supporting device fixing portion 40. As a result, the possibility that the user will feel discomfort due to a temperature difference from the ambient temperature when touching the exposed surface 159 of the supporting device receiving portion 41, can be reduced.

When the supporting device is coupled to the camera body 100, the exposed surface 159 of the supporting device receiving portion 41 coincides with a receiving surface 302 of the supporting device, and thus the supporting device can support the camera body 100 via the supporting device coupling section 157 and the exposed surface 159 of the supporting device receiving portion 41. Therefore, an excessively great force can be prevented from being applied from the supporting device to the exterior section 101 and the supporting device coupling section 157 of the camera body 100.

Here, regarding the camera body to which the supporting device 300 is coupled, when the exposed surface 159 of the supporting device receiving portion 41 does not coincide with the surface of the supporting device 300, it is necessary to carefully handle the camera body. As an example, the case is considered where when the supporting device 300 is coupled, the receiving surface 302 of the supporting device 300 is received not by the exposed surface 159 of the supporting device receiving portion 41 but by the exterior section outer surface 162. In such a camera body, a gap is formed between the exposed surface 159 of the supporting device receiving portion 41 and the supporting device 300. In other words, the exposed surface 159 of the supporting device receiving portion 41 does not come into contact with the supporting device 300, and thus it is possible to further screw the screw of the supporting device 300 into the screw hole 40a by applying a great force to the screw of the supporting device 300. Therefore, when the user applies a great force to the screw of the supporting device 300, an excessive pulling force is continuously applied to the supporting device coupling section 157 downwardly in the vertical direction, and a strain may occur in the exterior bottom portion 101a that supports the supporting device coupling section 157.

Further, as another example, a camera body is considered in which when the supporting device 300 is coupled thereto, the exposed surface 159 is greatly pushed out from the outer surface 162. In such a camera body, the exposed surface 159 comes into contact with the supporting device 300 but the outer surface 162 does not come into contact with the supporting device 300. Therefore, the fulcrum for the supporting device 300 to support the camera body is only the supporting device coupling section 157, and an excessive load may be applied to the supporting device coupling section 157. As a result, the supporting device coupling section 157 may break.

In the camera body 100 according to the present embodiment, the exposed surface 159 protrudes further than the outer surface 162 of the exterior section 101. Thus, it is assumed that when the supporting device 300 is coupled, the outer surface 162 of the exterior section 101 does not come into contact with the supporting device 300. However, since the supporting device receiving portion 41 having the exposed surface 159 is fixed to the frame bottom surface portion 154a that is a member formed from metal, desired strength of the supporting device receiving portion 41 is ensured. Thus, the supporting device coupling section 157 is less likely to break.

<1-5: Advantageous Effects>

Here, advantageous effects of the camera body 100 according to the present embodiment will be summarized.

(1)

In the camera body 100, the supporting device fixing portion 40 to which heat generated by the CMOS image sensor 110 is easily transmitted and the exposed surface 159 of the supporting device receiving portion 41 which the user may touch are separated from each other and are not in contact with each other. Thus, heat is not transmitted directly between the supporting device fixing portion 40 and the exposed surface 159 of the supporting device receiving portion 41 and only heat transfer by radiation and convection occurs therebetween, and hence it is possible to decrease the temperature of the supporting device receiving portion 41 as compared to that of the supporting device fixing portion 40. As a result, the possibility that the user will feel discomfort due to a temperature difference from the ambient temperature when touching the exposed surface 159 of the supporting device receiving portion 41, can be reduced.

(2)

The camera body 100 is supported by the supporting device 300 via the supporting device receiving portion 41 of the supporting device coupling section 157. In this manner, the supporting device receiving portion 41 of the supporting device coupling section 157 serves as a fulcrum. Thus, a load is less likely to be applied to the camera body 100 as compared to the case where the supporting device receiving portion 41 of the supporting device coupling section 157 cannot come into contact with the supporting device 300.

(3)

In the camera body 100, the supporting device fixing portion 40 and the supporting device receiving portion 41 are formed from metal, and further are fixed to the frames formed from metal. Thus, desired strength of the supporting device fixing portion 40 and the supporting device receiving portion 41 can be ensured.

(Other Embodiments)

The embodiment of the present invention is not limited to the embodiment described above, and various changes and modifications can be made without departing from the scope of the present invention.

(A)

In the embodiment described above, the interchangeable lens type digital camera has been described as an example, but an imaging apparatus to which the technology described herein can be applied is not limited thereto. The technology described herein is applicable to an imaging apparatus having a supporting device coupling section, and for example, is applicable to an interchangeable lens type digital video camera, a lens-barrel-integral-type digital camera, and a video camera.

(B)

In the embodiment described above, the supporting device fixing portion 40 is fixed to the frame front surface portion 154b, and the supporting device receiving portion 41 is fixed to the frame bottom surface portion 154a. However, each portion may be integrally formed with each frame. Specifically, the supporting device fixing portion 40 may be formed as a part of the frame front surface portion 154b, and the supporting device receiving portion 41 may be formed as a part of the frame bottom surface portion 154a.

(C)

In the embodiment described above, the interchangeable lens type digital camera has been described as an example, and thus the description has been given on the assumption that strength required for the supporting device fixing portion 40 and the supporting device receiving portion 41 are high. However, in the case of a lens-barrel-integral-type compact digital camera, the strength required for the supporting device fixing portion 40 and the supporting device receiving portion 41 is relatively low. Thus, the supporting device fixing portion 40 and the supporting device receiving portion 41 may be formed from synthetic resin, and the supporting device receiving portion 41 may be fixed to the exterior section. In addition, when the supporting device fixing portion 40 and the supporting device receiving portion 41 are formed from synthetic resin, the heat conductivity is low as compared to the case of being formed from metal such as stainless. Thus, increase in the temperatures of the supporting device fixing portion 40 and the supporting device receiving portion 41 can be reduced further.

INDUSTRIAL APPLICABILITY

The technology described herein can be used for reducing increase in the temperature of the supporting device coupling section and is applicable to an imaging apparatus to which a supporting device can be coupled, and the like. Specifically, the technology described herein is applicable to a digital still camera, a digital video camera, and the like.

DESCRIPTION OF THE REFERENCE CHARACTERS 1 digital camera (an example of imaging apparatus)
20 opening
40 supporting device fixing portion
40a screw hole
41 supporting device receiving portion
100 camera body (an example of imaging apparatus)
101 exterior section
101a exterior bottom portion
101b exterior front portion
101c exterior back portion
110 CMOS image sensor
111 AD converter
112 timing generator
113 CMOS circuit substrate
114 optical low-pass filter
115 vibrating plate
116 vibrating plate support portion
120 camera monitor
121 hinge
130 operation section
131 release button
132 power switch
140 camera controller
141 DRAM
142 main circuit substrate
150 body mount
151 body mount ring
152 body mount support portion
153 electric contact
154 main frame
154a frame bottom surface portion
154b frame front surface portion
157 supporting device coupling section
159 exposed surface
162 outer surface
165 power source
170 card slot
171 memory card
180 electric viewfinder
181 EVF crystal liquid monitor
182 EVF optical system
183 eyepiece window
190 shutter unit
195 heat sink
196 heat transmission portion
200 lens unit
210 zoom lens
213 zoom ring
215 drive section
220 OIS lens
224 OIS switch
230 focus lens
234 focus ring
240 lens controller
241 DRAM
242 flash memory
250 lens mount
251 lens mount ring
253 electric contact (body side)
260 diaphragm unit
290 lens barrel
300 supporting device
301 screw portion of supporting device
302 receiving surface of supporting device
800 single-lens reflex camera
801 camera body
802 lens unit
803 reflection mirror
804 pentaprism
805 optical finder
810 CMOS image sensor
813 CMOS circuit substrate
842 main circuit substrate
854 main frame
857 supporting device coupling section

The invention claimed is:

1. An imaging apparatus to which a supporting device can be coupled, the imaging apparatus comprising:
a supporting device coupling section including a supporting device fixing member having a screw hole into which the supporting device can be coupled, and a supporting device receiving member for receiving the supporting device, the receiving member mounted in a bottom surface of the imaging apparatus and having an opening into which the supporting device is inserted when the supporting device is coupled into the screw hole; wherein
the supporting device fixing member and the supporting device receiving member are separated from each other, and in a state in which the bottom surface of the imaging apparatus faces downward, the supporting device receiving member and the supporting device fixing member oppose each other across a vertical gap therebetween.

2. The imaging apparatus according to claim 1, wherein the supporting device receiving member is located within an exterior section having an outer surface of the imaging apparatus and fixed to a frame bottom surface portion located along a bottom surface of the exterior section.

3. The imaging apparatus according to claim 1, wherein the supporting device fixing member is located within an exterior section having an outer surface of the imaging apparatus and fixed to a frame front surface portion located substantially parallel to a front surface of the exterior section.

4. The imaging apparatus according to claim 3, wherein the frame front surface portion supports an imaging element which converts an optical image of an object into image data.

5. The imaging apparatus according to claim 1 wherein
a first frame portion and a second frame portion which are fixed to an exterior section are provided within the exterior section having an outer surface of the imaging apparatus,
the supporting device fixing member is integrally formed with the first frame portion, and
the supporting device receiving member is integrally formed with the second frame portion.

6. The imaging apparatus according to claim 1, wherein the supporting device receiving member and the supporting device come into contact with each other when the supporting device is coupled to the supporting device coupling section.

7. The imaging apparatus according to claim 1, wherein in a state in which the bottom surface of the imaging apparatus faces downward, the supporting device receiving member protrudes downward from the bottom surface of the imaging apparatus.

8. The imaging apparatus according to claim 1, wherein in a state in which the bottom surface of the imaging apparatus faces downward, the supporting device receiving member protrudes upward relative to an inner surface of a frame bottom surface portion for forming the bottom surface of the imaging apparatus.

9. The imaging apparatus according to claim 1, wherein the supporting device fixing member and the supporting device receiving member are metal members.

* * * * *